C. LUDLOW & W. P. BAUSMITH.
HEATING AND VENTILATING SYSTEM.
APPLICATION FILED DEC. 13, 1912.

1,123,334.

Patented Jan. 5, 1915.

2 SHEETS—SHEET 1.

C. LUDLOW & W. P. BAUSMITH.
HEATING AND VENTILATING SYSTEM.
APPLICATION FILED DEC. 13, 1912.
1,123,334.
Patented Jan. 5, 1915.
2 SHEETS—SHEET 2.
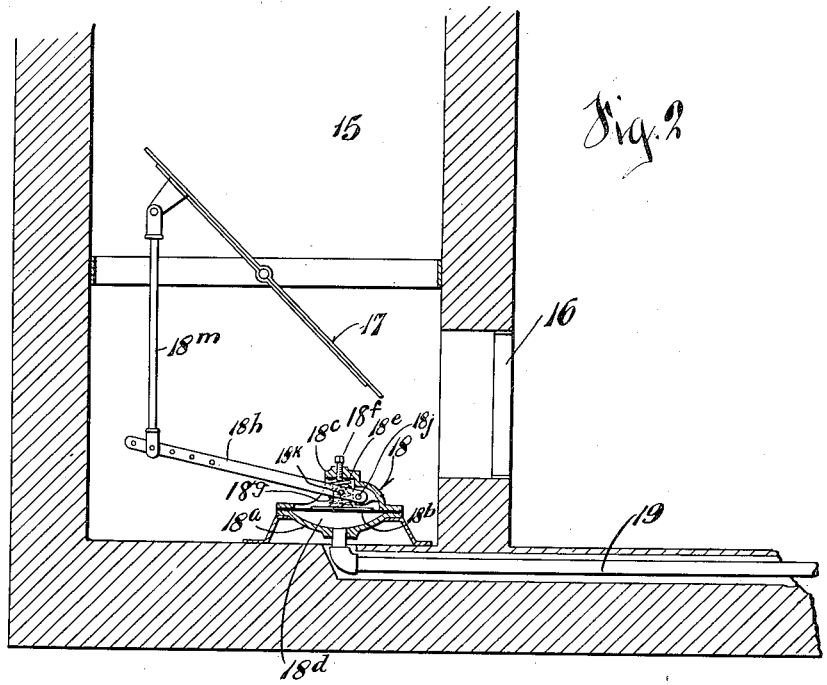
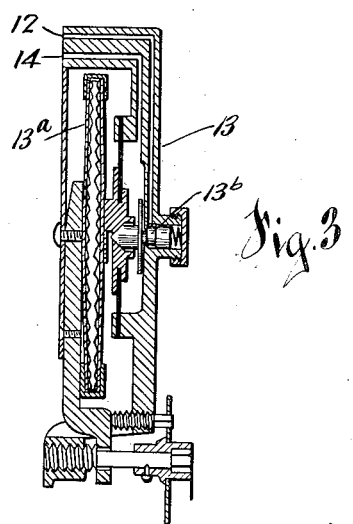

UNITED STATES PATENT OFFICE.

CHARLES LUDLOW, OF NORWOOD, AND WILLIAM P. BAUSMITH, OF PLEASANT RIDGE, OHIO.

HEATING AND VENTILATING SYSTEM.

1,123,334.  Specification of Letters Patent.  Patented Jan. 5, 1915.

Application filed December 13, 1912. Serial No. 736,656.

*To all whom it may concern:*

Be it known that we, CHARLES LUDLOW and WILLIAM P. BAUSMITH, citizens of the United States, residing, respectively, at Norwood and Pleasant Ridge, in the county of Hamilton and State of Ohio, have invented certain new and useful Improvements in Heating and Ventilating Systems, of which the following is a specification.

Our invention relates to heating and ventilating, and has for its object the automatic control of ventilation simultaneously with and in conjunction with the heating.

Our invention consists in the combination of parts hereinafter more fully described and claimed.

Figure 1:
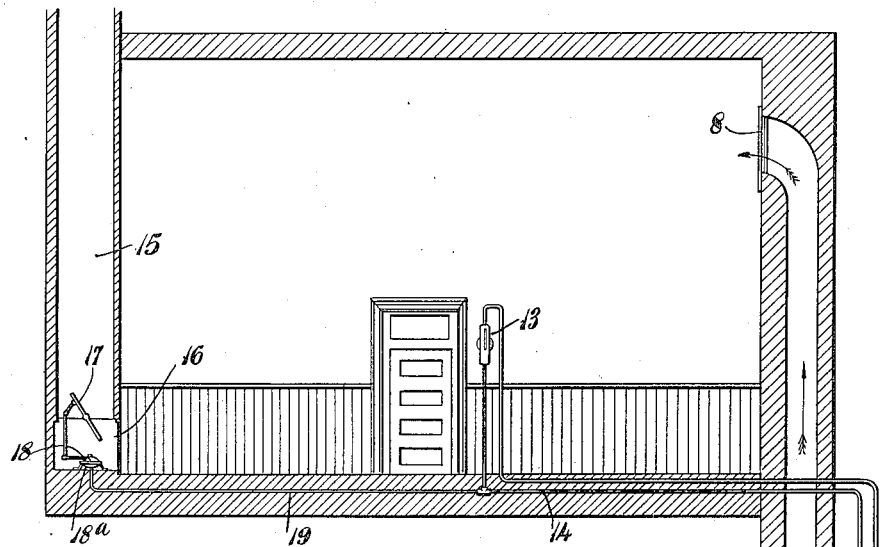
Figure 1:
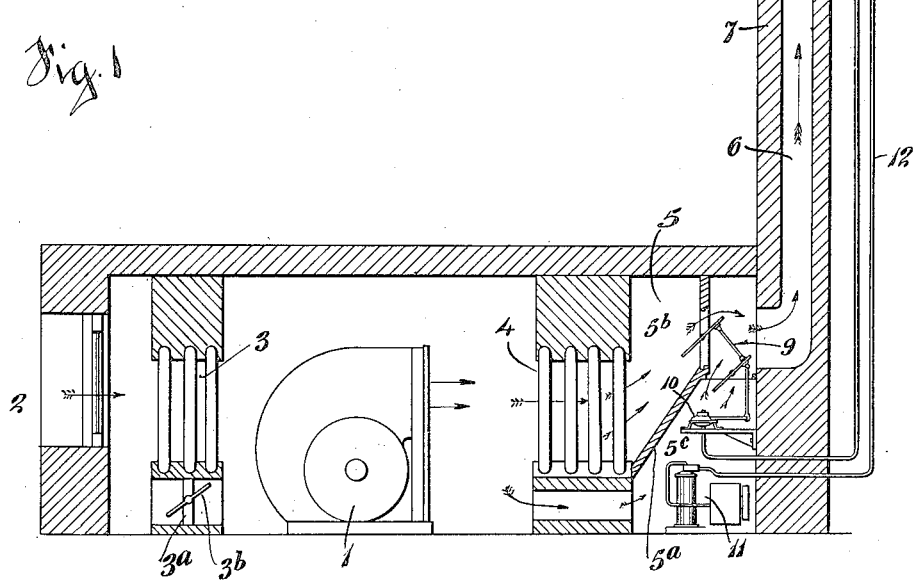

In the drawing: Figure 1, is a sectional view of part of a building illustrating a heating and ventilating system installed according to our invention. Fig. 2, is an enlarged sectional view of the bottom of the ventilating shaft, showing the diaphragm motor also in section. Fig. 3, is a sectional detail of the thermostat.

We have chosen for illustration of our invention a heating system comprising a fan 1, located in the basement of the building, and drawing air into the basement through an opening 2, over a suitable tempering or heating apparatus 3, discharging the air over another heating apparatus 4, into the plenum chamber 5. Under the first heating apparatus 3 is a by-pass 3ª, which is provided with a damper 3ᵇ, by means of which the proportion of air drawn directly through the heating apparatus or allowed to pass under the heating apparatus may be regulated. This heating apparatus 3 tempers the air. The second heating apparatus 4 also has a passage under it, and in the plenum chamber is a partition 5ª, dividing the plenum chamber 5 into an upper hot air compartment 5ᵇ and a lower tempered air compartment 5ᶜ. The upper hot air compartment 5ᵇ receives its air directly through the second heating apparatus 4, but the tempered air compartment 5ᶜ receives its air directly from the fan as it was tempered by the first heating apparatus 3. The partition 5ª is so positioned that it will effect this division of the two supplies of air of different temperatures. At the side of the partition opposite the second heating apparatus 4, the heating duct 6 leads from the plenum chamber 5 and up through the wall 7 of the building, to the room to be heated, opening into the room through a register 8, in the upper part of the room. The partition 5ª in the plenum chamber is so terminated that it leaves an opening from the hot air compartment and also an opening from the tempered air compartment.

To regulate the proportion of hot and tempered air which may flow into the heating duct 6, from the respective compartments a double damper 9 is swung in the space at the termination of the partition 5ª in such a manner that it may close the outlet from either compartment, while opening the outlet from the other compartment. Thus after the room becomes too warm, this damper 9 may be opened to reduce the amount of hot air entering the heating duct 6 and accordingly increase the amount of tempered air so entering; or if the room becomes too cold the reverse operation will be resorted to. This double damper is operated by the diaphragm motor 10, operated by compressed air supplied from an air compressing plant 11, located in the basement. This supply of air comes through a pipe 12, that leads up from the air compressing apparatus to the thermostat 13, located in a suitable position in the room to be heated, and through a pipe 14, leading down from this thermostat to the diaphragm motor in the basement.

The room is ventilated through a ventilating shaft 15, the foul air flowing from the room through a register opening 16, at the bottom of the shaft next to the floor of the room. At the lower part of this shaft 15, just above the register opening 16, is a damper 17, so swung that it may completely close the bottom of the ventilating shaft, or leave it open at a greater or less distance as the damper is swung across the shaft.

So far as the heating and ventilating system has been described, the heating of the room considered independently of the ventilating, and of the effect of more or less ventilation on the temperature of a room in spite of the heating apparatus, will be regulated to a nicety through the operation of the double damper 9 in the outlets from the plenum chamber.

The method of use of the above described system where the rooms are to be heated during the day, but allowed to cool during the night, is to have the damper in the ventilating shaft closed at night when the room is not being heated, thus preventing the dropping of cold air from outdoors, down into the room through the ventilating shaft. In the morning, when the fan is started to let the heated air into the room and bring it to the proper living temperature, the damper in the ventilating shaft is opened to its full extent, permitting ventilation of the room as it is heating up. Then again, at night, when the fan is stopped, this damper in the ventilating shaft is closed tight again. In such a system, this damper is controlled from the basement by the operative in charge of the heating apparatus and fan, who may never visit the room being heated, has no knowledge of the conditions of ventilation from time to time during the day in that room and who only arbitrarily permits full ventilation in the morning, and completely shuts it off at night. Furthermore, this operative performs this service if he remembers to do so, but should he forget to close the damper in the ventilating shaft at night, the room will be so cold the next morning, that it can be heated only with great difficulty, or if the weather conditions be very severe, may render it impossible to get the room warm enough to be comfortable.

Should the operative remember to close the damper at night, but forget to open it in the morning, the room will be heated up, but will be deprived of ventilation, and it may cause great discomfort or even injury to the occupants of the room, before the reason is discovered by them, and the operative reminded to open the ventilator. Further, during severe weather with a high wind increasing the pressure outside the building, even the best constructed doors and windows fail to effectually keep out all the outside air, and there will be an increased ventilation due to the inflow around the doors and windows, causing an increased rate of outflow through the ventilating shaft. This may continue to such length that when the double damper controlling the supply of hot air has completely closed the outlet from the tempered air compartment and completely opened that from the hot-air compartment, and is letting in an unmixed supply of hot air, even then the room cannot be maintained at the right temperature. When such a condition is reached the limitations of the heating system have been reached, and some other provision is necessary in order to get the room properly heated. It is found by experience that this further provision needed is the reduction of area of the entrance to the ventilating shaft in proportion to the increased speed of outflow of air from the room. By thus reducing this area, the outflow of air is retarded in such a degree that the complete change of air required in the room takes place during the proper period of time, in proportion to the amount of air unavoidably entering due to the outside weather conditions. This gives the heating apparatus an advantage which it had not with the ventilating shaft wide open, and allows it to heat the room properly. We effect this regulation automatically by providing a diaphragm motor 18, to operate the damper 17. The diaphragm motor 18, as seen in Fig. 2, comprises a body 18ª into which the pipe 19, conducts the supply of air under pressure. The body is concave on one side, and across this side is stretched the diaphragm 18ᵇ, inclosing a chamber 18ᵈ, so as to be distended as the pressure of the air in the chamber rises. Resisting this distention, springs are provided, one of which 18ᵉ, is seen in the drawing, compressed between the outside of the diaphragm, and the inside of the frame 18ᶜ. The pressure of the spring may be regulated by adjusting screw 18ᶠ screwed into the frame 18ᶜ, against the spring. A lug 18ᵍ is fastened to the diaphragm 18ᵇ, and a lever 18ʰ has a fulcrum 18ʲ in the frame 18ᶜ, while a pin 18ᵏ passes through the lug and the lever so that as the diaphragm moves in or out, the lever will be swung accordingly. This lever has its free end connected to the ventilating damper by means of a rod 18ᵐ and the various parts are so positioned that the diaphragm motor, operated as described, will close or open the damper 17 as has been alluded to. The diaphragm motor 10 is similar to the one above described.

The thermostat 13, which we prefer to use in connection with our invention, as shown in Fig. 3, comprises a hollow disk 13ª, the sides of which are distensible, and which is filled with a volatile liquid having a low boiling point. The movements of this disk under the action of the pressure inside of it operate the valve device 13ᵇ in such a manner as to control the pressure in the pipes leading from it exactly in accordance with the variations in temperature in the room being heated, receiving the air under uniform pressure from the compressing apparatus, through the pipe 12. This diaphragm motor 18 is supplied with air through the connection of its pipe 19 with the pipe 14 that leads down from the thermostat 13, and the pressure in this pipe will always be the same as the pressure in the pipe 14, and will vary as it varies under the action of the thermostat.

We have discovered that a non-synchronous action of the ventilating damper and the heat regulating damper, properly supplied, will effect the automatic control of the ventilation with respect to the heating in such a manner as to obtain the desired results. This non-synchronous action is provided by so adjusting the spring in the diaphragm motor 18 that it will be weaker than the spring in the diaphragm motor 10, in just the right degree to open or close the damper in the ventilating shaft to the proper extent and at the proper times relative to the extent and times of opening and closing of the heat regulating damper 9. Thus, the diaphragm motor 18 may be so adjusted that when the temperature in the room falls three degrees below the desired living temperature, this motor will operate to close the ventilating damper completely. When at night the fan is stopped and no more hot air is supplied to the room, the temperature will fall the three degrees, and the ventilating damper will close tight automatically, and, the temperature not rising again, will remain closed all night. In the morning when the fan is again started, forcing hot air into the room, the ventilating damper will be closed, but the temperature in the room will rise rapidly to the limit allowed by the thermostat and during that rise, in the early part of it, the diaphragm motor 18, owing to the weakness of its spring, will be caused to act under the rising pressure of the air in the pipe 19, and will open the damper 17 allowing the ventilation to begin. Not only will a complete opening and closing thus be effected upon the starting and stopping, respectively, of the heating machinery, but a variation in the extent of opening of the ventilating damper will take place when, due to outside conditions, the heating of the room is interfered with past the limitations of the heating system. Thus, when a high wind is blowing, there will be some inflow of air around the doors and windows, and there will also be some suction created up through the ventilating shaft, calling for a reduced area of inlet to the ventilating shaft as has above been alluded to. The diaphragm motor 18 is operated to reduce this area under the influence of the thermostat 13 through the pipe 19 because the temperature of the room will be slightly reduced, even with the hot air inlet open and the tempered air inlet completely closed. For example: If the desired temperature of the room is 70 degrees, and the diaphragm motor is set to completely close the ventilating shaft at 67 degrees, the motor will begin to act when the temperature in the room becomes between 69 and 68 degrees, and will partially close the damper. This partial closing of the damper then allows the heating apparatus to overcome the outside influences, the temperature of the room again rising to normal, and the damper in the ventilating shaft will regain its former position. These automatic adjustments take place constantly and will maintain practically a uniform temperature in the room in spite of the unfavorable weather conditions, which ordinarily completely overcome the action of the ordinary heating system with a manually controlled ventilating system.

From the foregoing description, therefore, it will be understood that we do not limit ourselves to the illustrations given herein for example, but

What we claim as new and desire to secure by Letters Patent is:

1. In a heating and ventilating system, in combination with a room, and means supplying heated air to the room under pressure, a foul air ventilating outlet from the room, a regulator for the heated air supply means, a damper in the ventilating outlet, operative mechanism for the regulator, operative mechanism for the damper, a motive medium common to the operative mechanisms of the regulator and the damper, respectively, and a thermostat influencing the force of the motive medium uniformly as applied to both regulator and damper mechanisms, but said damper mechanism being more sensitive to the force of the motive medium and thereby responding more quickly to variations of the force under the influence of said thermostat.

2. In a heating and ventilating system, in combination with a room, heating means for the room, a foul air ventilating outlet for the room near the bottom thereof, a regulator for the heating means, a damper in the foul air outlet, a thermostat, diaphragm motors operating the regulator for the heating means and the damper in the foul air outlet, respectively, each of said motors having a spring resisting fluid pressure in the motor, and means for conducting fluid to the respective motors through and under the control of said thermostat, the spring of one of said motors being weaker than the spring of the other of said motors and the fluid being supplied under equal pressure to both motors, for the purposes set forth.

3. In a heating and ventilating system, in combination with a room, heating means for the room, ventilating means for the room, a regulator for the heating means, a regulator for the ventilating means, a thermostat, two diaphragm motors operating respective regulating means, each of said motors having a spring resisting fluid pressure in the motor, means for conducting fluid to the respective motors through and under the control of said thermostat, the spring of the motor operating the regulator for the ventilating means being weaker than the spring of the motor operating the regulator for the heating means, and the fluid being supplied under equal pressure to both motors, for the purposes set forth.

4. In a heating and ventilating system, in combination with a room, a hot air inlet to the room, a ventilating outlet from the room, a damper in the hot air inlet, a damper in the ventilating outlet, a thermostat, diaphragm motors operating the respective dampers, each motor having a spring resisting fluid pressure in the motor, means for supplying fluid to said motors through and under the control of said thermostat, the spring of the motor that operates the damper in the ventilating outlet being weaker than the spring of the motor that operates the damper in the hot air inlet, and the fluid being supplied under equal pressure to both of said motors, for the purposes set forth.

5. In a heating and ventilating system, in combination with a room, a plenum chamber comprising a hot air compartment and a tempered air compartment, a heating duct leading into said room and communicating with both compartments of the plenum chamber, a double damper closing communication between either of said compartments and the heating duct and simultaneously opening communication between the other compartment and the heating duct, a motor having a diaphragm, and a lever connected to the diaphragm and to the double damper, means for supplying fluid to the motor to move the diaphragm and operate the double damper, a spring on the motor resisting the action of the fluid on the diaphragm, a thermostat acting under the influence of the temperature in the room to vary the pressure of the fluid as supplied to the motor, a ventilating shaft leading from the room, a damper in the ventilating shaft, a motor having a diaphragm, and a lever connected to the diaphragm and to the said damper in the ventilating shaft, means for supplying fluid to said motor under equal pressure with that supplied to the motor operating the double damper for the heating duct, and a spring on the motor that operates the damper in the ventilating shaft, which spring is weaker than the spring on the motor that operates the double damper for the heating duct, for the purposes set forth.

6. In a heating and ventilating system, in combination with a room, and means supplying heated air to the room under pressure, a foul air ventilating outlet from the room, a regulator for the heated air supply means, a damper in the ventilating outlet, operative mechanism for the regulator, operative mechanism for the damper, a motive medium common to the operative mechanisms of the regulator and the damper, respectively, and a thermostat influencing the force of the motive medium uniformly as applied to both regulator and damper mechanisms, but said damper mechanism being more sensitive to the force of the motive medium and thereby responding more quickly to variations of the force under the influence of said thermostat, the variations of the force of said motive medium due to said thermostat being gradual, and the operations of said regulator and said damper being gradual in accordance with the variation of the force, but nonsynchronous due to the greater sensitiveness of the damper mechanism as aforesaid.

CHARLES LUDLOW.
WILLIAM P. BAUSMITH.

Witnesses:
JAMES N. RAMSEY,
CATHERINE DORAN.